United States Patent [19]
Jones et al.

[11] 3,895,339
[45] July 15, 1975

[54] ACOUSTIC CAMERA APPARATUS

[75] Inventors: Charles H. Jones, Murrysville, Pa.; George A. Gilmour, Severna Park, MD

[73] Assignee: Westinghouse Electric Corporation, Pittsburgh, Pa.

[22] Filed: Mar. 29, 1974

[21] Appl. No.: 456,420

[52] U.S. Cl. ............................................... 340/3 R
[51] Int. Cl. .............................................. G01s 9/66
[58] Field of Search ........... 340/3 R, 3 F, 5 MP, 8 L

[56] References Cited
UNITED STATES PATENTS

| | | | |
|---|---|---|---|
| 2,528,730 | 11/1950 | Rines | 340/5 MP |
| 3,325,777 | 6/1967 | Fyler | 340/3 R |
| 3,389,372 | 6/1968 | Halliday et al. | 340/3 R |
| 3,585,573 | 6/1971 | Fischer, Jr. | 340/3 R |
| 3,742,436 | 6/1973 | Jones | 340/3 R |

Primary Examiner—Richard A. Farley
Attorney, Agent, or Firm—D. Schron

[57] ABSTRACT

A transmitter transducer projects a short time pulse of acoustic energy which impinges upon and progressively insonifies a target area to be viewed. Acoustic returns are received by an acoustic lens which focuses the energy from individual adjacent receiver strips of the target area onto a plurality of receiver transducers located behind the lens.

The output signals provided by the receiver transducers are suitably processed and displayed so as to portray the target area and any targets on it.

The receiver transducers are relatively small and are arranged in a row with the acoustic lens being of the type which includes one or two cylindrical surfaces and arranged parallel to the target area to be viewed. Two sets of transducers may be utilized in conjunction with one lens for forming two sets of receiver beams and when mounted on a carrier vehicle, can be used for sidelooking sonar operations. Another lens and set of receiver transducers is utilized for imaging areas forward of the carrier vehicle for imaging areas missed by the other two receiver beams.

13 Claims, 32 Drawing Figures

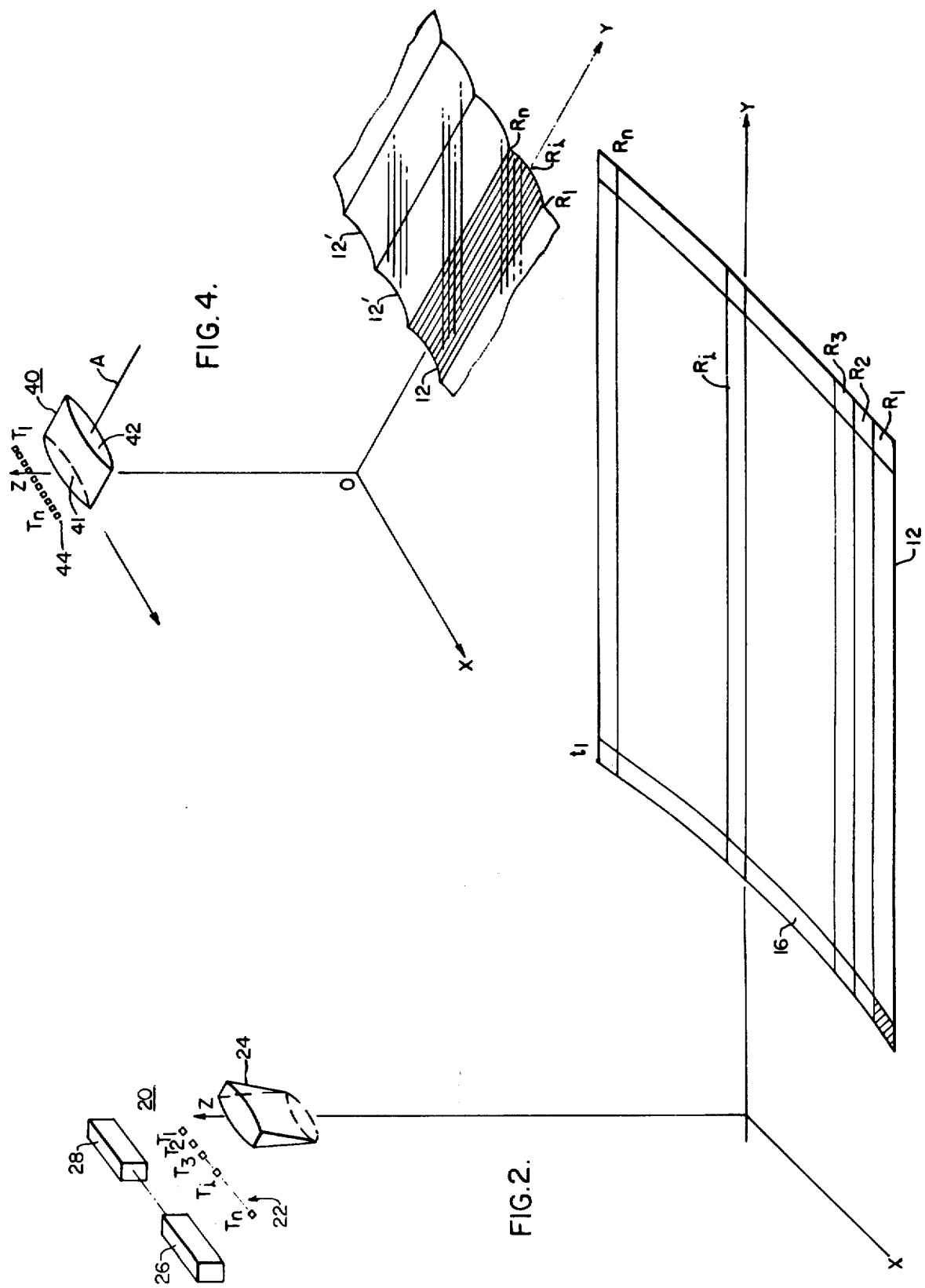

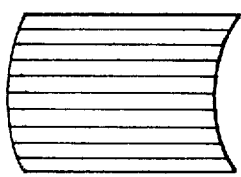
FIG. 21.
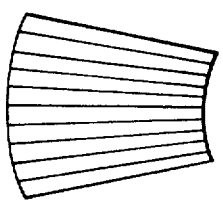
FIG. 24.
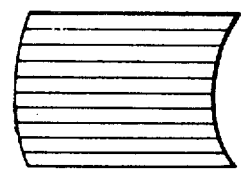
FIG. 26.
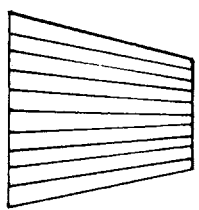
FIG. 22.
FIG. 23.
FIG. 25.
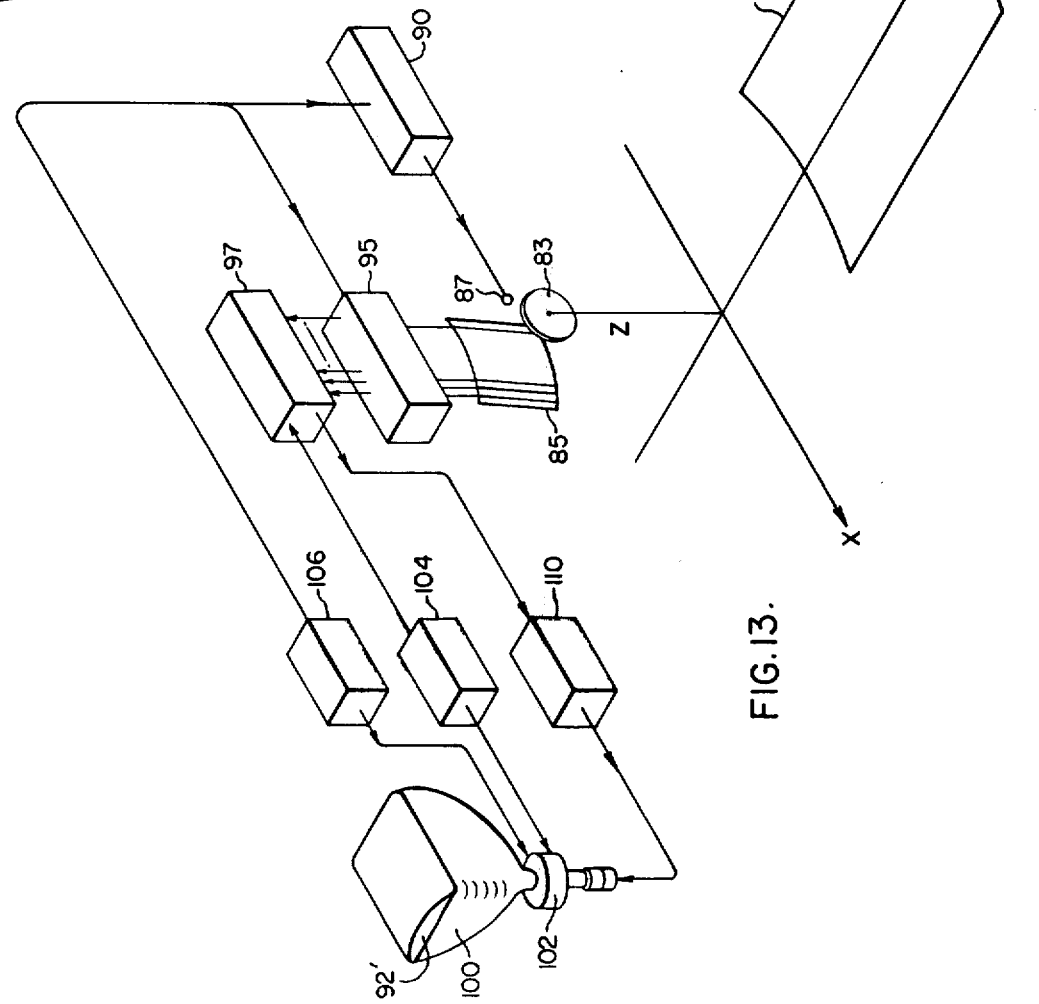
FIG. 13.

FIG. 19.
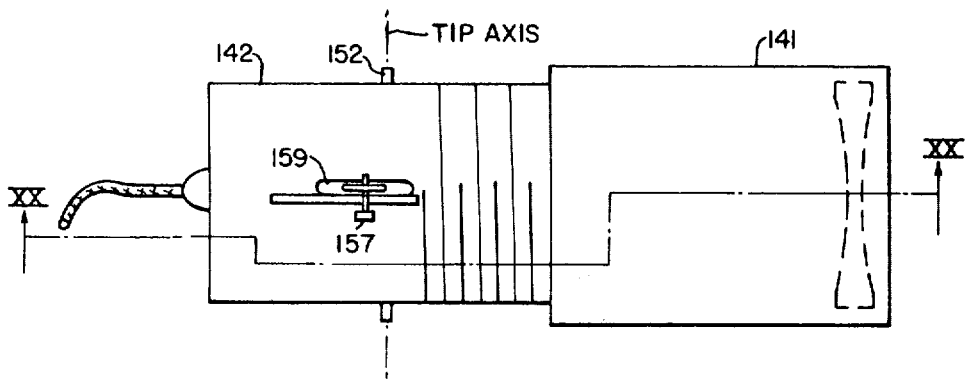
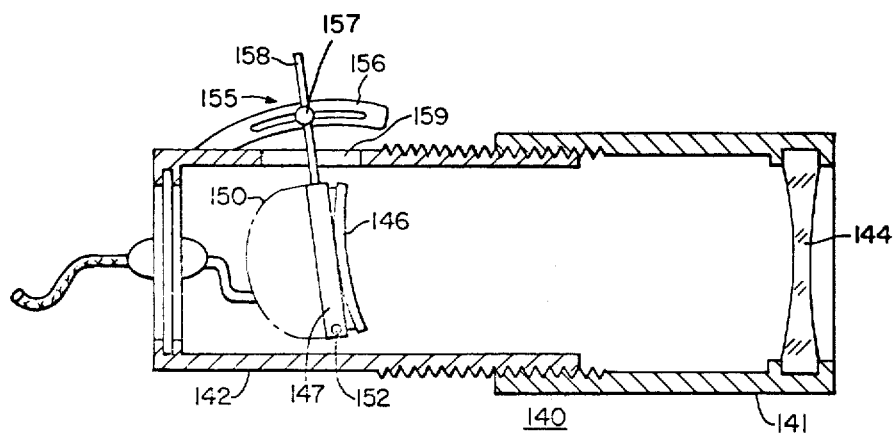
FIG. 20.

ACOUSTIC CAMERA APPARATUS

CROSS REFERENCE TO RELATED APPLICATIONS

This case is related in subject matter to copening applications Ser. No. 456,421 and Ser. No. 456,419 concurrently herewith and both assigned to the same assignee as the present invention.

BACKGROUND OF THE INVENTION

1. Field of the Invention:

This invention relates to acoustic imaging systems for obtaining an acoustic picture of a target area of interest.

2. Description of the Prior Art:

In underwater viewing systems, utilizing visible light, scattering is a primary problem in that in turbid water, with dirt particles present, the scattering and attenuation make optical imaging almost impossible. To this end, acoustic imaging systems utilizing compressional wave propagation are utilized for acoustic imaging under water.

In one type of acoustic imaging system, an acoustic lens or reflector is utilized in conjunction with individual transducers provided for each resolution element desired. This may be accomplished by utilizing a sheet of transducer material diced into small squares placed behind the lens or in front of the reflector, with an amplifier and necessary signal processing electronics connected to each transducer element. The output from the signal processing channel connected to each transducer can be electronically scanned one row at a time and the results displayed on a cathode ray tube. For a typical picture, having a resolution of 200 × 261 resolution elements, there would be required not only 52,200 separate transducer elements but a like amount of amplifiers and other signal processing circuits for each transducer output. Although a high resolution picture is obtained, the cost and complexity of such systems can be prohibitive. Examples of an imaging system using an acoustic lens may be found in U.S. Pat. Nos. 2,528,730 and 3,325,777. A target detection system using an acoustic reflector with a plurality of adjacent transducers for forming multiple adjacent beams may be found in U.S. Pat. No. 3,389,372. In the latter system due to the extremely narrow vertical beam width directional acuity is obtained throughout a sector in one plane only. If directional acuity is desired in both elevation and azimuth then a two dimensional array of transducers is used with a spherical reflector.

Such systems present a picture of targets in the water at a selected range from the apparatus.

For many operations it is desired to obtain an imaging of a target area such as the sea bottom such that it is focus from some minimum range out to some maximum range of interest, rather than just at one fixed selected range, as in these prior art systems.

In U.S. Pat. No. 3,742,436 multiple beams are formed which are in focus from some minimum range out to a maximum range of interest, of a target area however the present invention accomplishes a similar result with the elimination of much of the beam forming apparatus previously required.

SUMMARY OF THE INVENTION

The present invention obtains a high resolution acoustic picture of such a target area by operation in the near field and by utilizing time resolving techniques in the range axis and acoustic imaging techniques in the axis perpendicular thereto, that is, the lateral axis.

A transmitter transducer projects a short time pulse of acoustic energy toward a target area to be viewed and the pulse impinges upon the closest range of interest in a narrow strip which is long in the lateral direction and extremely short in the range direction. The acoustic impingement is herein termed insonification and the insonified strip scans outward in the target area range axis out to some maximum range.

The receiving apparatus includes a plurality of receiver transducers and an acoustic focusing element such as a lens. Each transducer in conjunction with the lens, is associated with a particular receiver beam which receives acoustic reflections from the insonified area and more particularly each receiver beam receives reflected energy from a narrow strip on the target area with the strip being elongated in the range direction and narrow in the lateral direction, with all of the transducers being arranged relative to the lens such that these elongated strips lie adjacent one another.

The focusing element is a cylindrical reflector or cylindrical lens, that is a lens having one or more cylindrical surfaces, and lying on an axis which is generally parallel to the target area range axis, which in a typical operation will be horizontal. The construction of the cylindrical lens is such that for each elongated receiver area or swath, the reflected energy from the minimum range of interest out to the maximum range of interest will be focused onto a particular transducer of the receiver array. The receiver transducers themselves may be comparatively small, with a maximum dimension in the order of 1 $\lambda$ to 3 $\lambda$ where $\lambda$ is the operating wavelength in water.

By positioning two arrays of these receiver transducers near opposite ends of the cylindrical lens, two different sets of parallel receiver beams are formed and with the apparatus positioned on a carrier vehicle, port and starboard areas may be simultaneously viewed.

The output signals from the receiver transducers are suitably processed and provided to a display.

BRIEF DESCRIPTION OF THE DRAWINGS

FIG. 2 illustrates an arrangement for receiving reflected acoustic energy from the insonified target area;

FIG. 4 illustrates a preferred embodiment of the present invention;

FIG. 13 illustrates one set of components which can be used to provide a display of a target area;

FIG. 19 illustrates apparatus in which the distance of the acoustic lens and receiver transducer array may be varied and in which the angle that the array makes with the lens axis can also be varied;

FIG. 20 is a cross sectional view along the line XX of FIG. 19; and

FIGS. 21 to 26 illustrate various shaped target areas and receiver transducer arrays associated therewith.

DESCRIPTION OF THE PREFERRED EMBODIMENT

Figure 1:
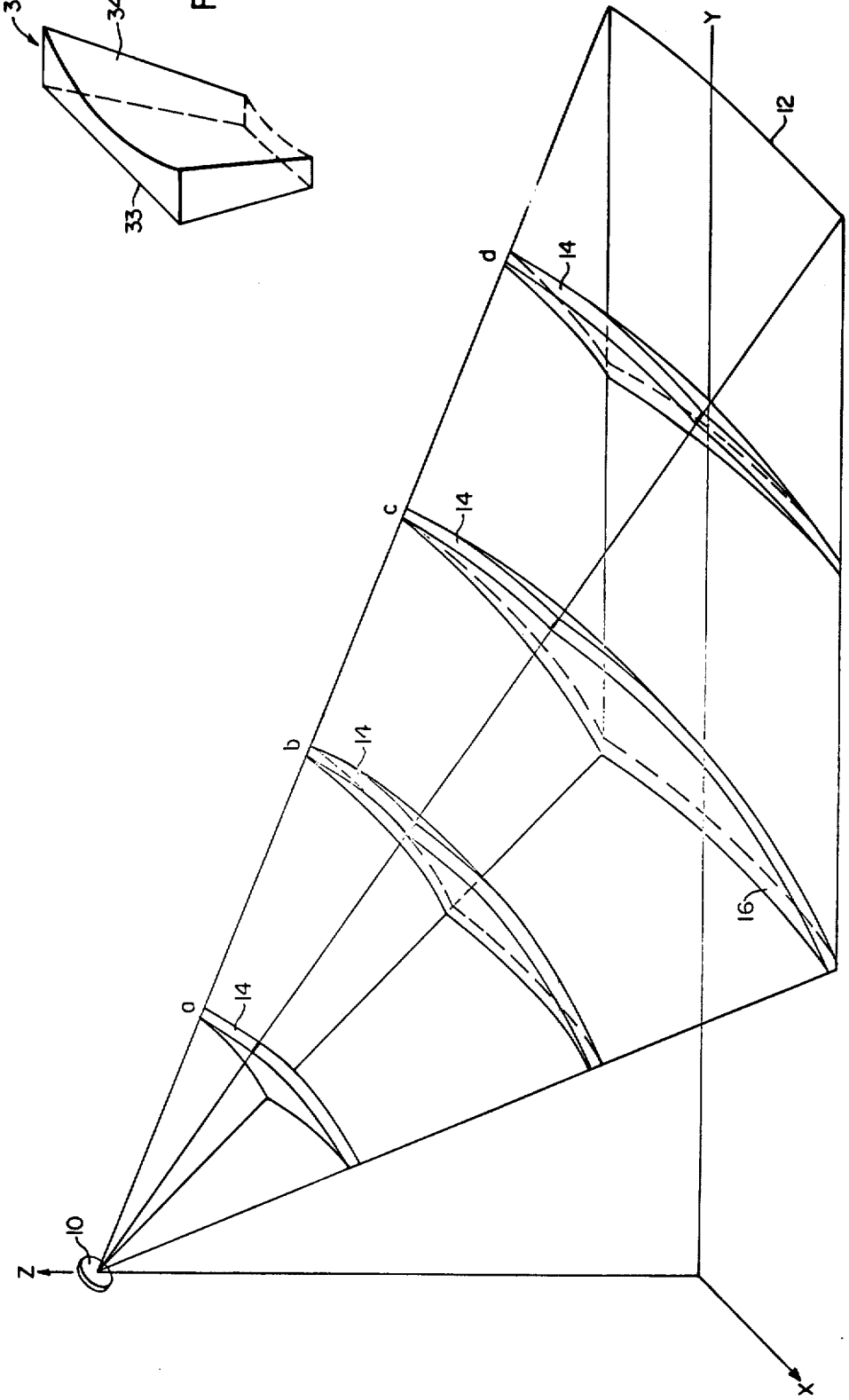
FIG. 1 illustrates in a X, Y, Z coordinate system, an acoustic transmission and the insonification of a target area.

FIG. 1 serves to illustrate the projection of a short acoustic pulse by a transmitter transducer, onto a target area of interest. The transmitter transducer 10 is positioned in an X, Y, Z coordinate system where the Y axis represents the range axis of the target area. The X axis is perpendicular thereto and represents the lateral axis while the Z axis is vertical. The vertical beam width of the transmitter transducer 10 may be in the order of 40° and the transducer is oriented to generally point to the target area of interest 12. The transmitted pulse 14 is shown at four different positions $a$, $b$, $c$ and $d$ in its travel. The pulse 14 strikes the closest range of interest $R_m$ at some time $t_1$ and insonifies a narrow strip 16 which is curved somewhat but is generally elongated in the lateral axis X and relatively narrow in the direction of the range axis Y. This insonified narrow strip then proceeds along the range axis Y and returns therefrom are received by receiver apparatus, out to some maximum range of interest $R_M$.

The receiver apparatus 20 is illustrated in FIG. 2 and includes an array 22 of receiver transducers designated $T_1, T_2, T_3 \ldots T_i \ldots T_n$. In order to focus reflected energy from the insonified target area 12 and targets on it, onto the individual receiver transducers, there is provided an acoustic focusing element in the form of an acoustic lens 24 which is generally facing the target area 12 and being of such design as to provide for a varying focal length from top to bottom, with the longer focal length being at the top and the shorter focal length being at the bottom.

The apparatus forms a plurality of adjacent receiver beams for receiving reflected energy from receiver strips on the target area, each receiver strip or swath being elongated in the range axis Y and being relatively narrow in the lateral axis X. Several receiver strips are illustrated in FIG. 2 and are designated $R_1, R_2, R_3 \ldots R_i \ldots R_n$, with the reflected energy therefrom being focused onto respective transducers $T_1, T_2, T_3 \ldots T_i \ldots T_n$.

At time $t_1$, the insonified strip 16 intersects all of the receiver strips $R_1$ to $R_n$ in respective small elemental areas the reflections therefrom being focused onto respective receiver transducers by the lower portion of the lens 24. As the insonified strip proceeds out to the maximum range, reflections from each receiver strip will pass through the entire lens 24 but only that energy which passes through progressively higher portions of the lens 24 will be focused onto the respective receiver transducers. In response to the receipt of acoustic energy focused onto the receiver transducers by the lens 24, respective output signals will be provided to signal processing circuits 26 for detecting informational content and providing an output to a recording or display means 28.

For clarity, the figure has not been drawn to scale, and the transmitter transducer together with its power supply has not been illustrated although such transmitter transducer could be positioned adjacent the receiver apparatus 20 or the receiver transducers themselves could be operated in conjunction with the focusing element to also transmit the insonifying pulse.

Acoustic imaging is similar to optical imaging. A lens made of a material with a speed of sound different than that of water, is utilized herein to focus acoustic energy and the same equations utilized to design optical lenses may be utilized to design acoustic lenses. The lens 24 illustrated in FIG. 2 is constructed of a thin shell such as stainless steel, plastic, aluminum, to name a few and filled with a liquid having a velocity of sound therein less than water, trichlorotrifluoroethane being one example and sold under trade names such as Freon 113 or Genetron.

Figure 3:
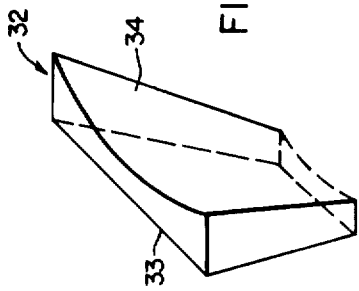
FIG. 3 illustrates an acoustic lens which can be utilized in place of the lens illustrated in FIG. 2.

A solid lens of a material such as a polystyrene plastic may also be utilized, however, the solid lens would have a different curvature than the liquid lens, as illustrated in FIG. 3. Since the velocity of sound in polystyrene is higher than that in water the lens surface is concave rather than convex. Although both the front and rear surfaces of the lens could be curved, the lens 32 is shown as including a planar rear surface 33 and a curved front surface 34 defining a section of a cone.

FIG. 4 illustrates an arrangement which eliminates the need for a varying focal length lens by providing an acoustic focusing element having one or more cylindrical surfaces. In FIG. 4, the element takes the form of a cylindrical lens 40 having top and bottom cylindrical surfaces 41 and 42, with the lens being disposed about an axis A which is above and parallel to the range axis Y. In a typical operation therefore, the axis A would be horizontal.

As was the case, with respect to FIG. 2, the arrangement of FIG. 4 defines n receiver beams for receiving reflected acoustic energy from respective receiver strips $R_1$ to $R_n$ of the target area 12, the returns being focused onto respective transducers $T_1$ to $T_n$ of the receiver array 44.

If the appartus is mounted upon a carrier, traveling in the direction of the arrow, multiple acoustic transmissions may take place during vehicle travel to image successive target areas, and in FIG. 4, previously insonified areas from which return signals have been processed are indicated by the numerals 12'. The apparatus therefore in addition to being useful for taking an acoustic picture from a stationary position is also applicable for side look sonar applications wherein the speed or search rate of the carrier vehicle may be increased by the number of simultaneous receiver beams formed.

Figure 5C:
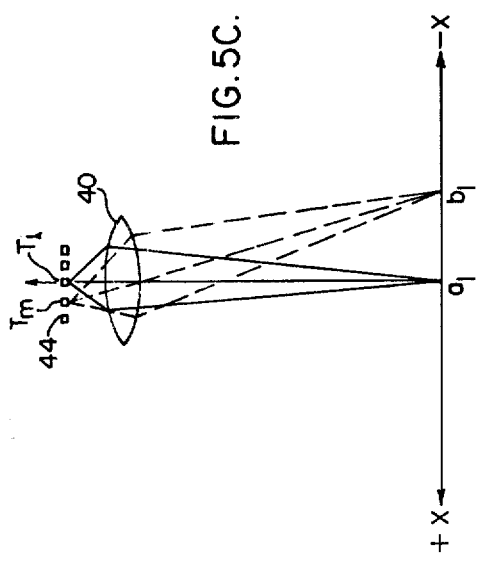
FIGS. 5A, B and C are respective plan, side and front views of the arrangement of FIG. 4.
Figure 5A:
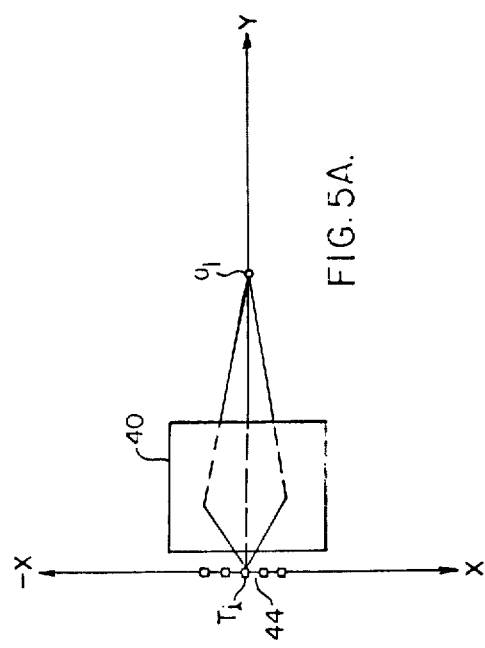
Figure 5B:
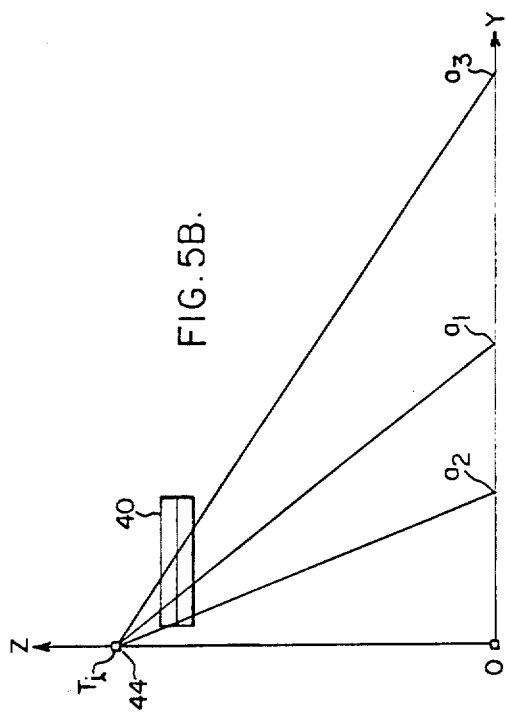

FIGS. 5A, 5B and 5C serve to better illustrate the orientation of the receiver transducers with respect to the acoustic lens 40 of FIG. 4.

FIG. 5A is a plan view of arrangement illustrating a few of the receiver transducers of the array 44 with acoustic energy from an area $a_1$ on the range axis Y being focused through the lens 40 onto receiver transducer $T_i$. FIG. 5B is a side view and in addition to illustrating the acoustic energy path from area $a_1$ through the lens to receiver transducer $T_i$ additionally shows the path from two other areas $a_2$ and $a_3$. Area $a_2$ may emanate from the beginning of the receiver strip, that is from range $R_m$ and area $a_3$ may be located at the maximum range of the receiver strip, FIG. 5B therefore illustrating that acoustic returns from the same receiver strip are focused onto the same receiver transducer.

FIG. 5C illustrates a front view of the arrangement with acoustic energy from area $a_1$ being focused onto receiver transducer $T_i$ and acoustic energy from an area $b_1$ of another receiver strip being focused onto a different receiver transducer $T_m$. Lens 40 is cylindrically convex and would be of the variety having a thin shell filled with a liquid such as previously described. The lens could also be a solid lens in which case it would be cylindrically concave.

The acoustic focusing element does not necessarily have to be transmissive lens. The focusing element could take the form of a reflective member such as cylindrical reflector 50 in FIG. 6 oriented above and slightly ahead of the receiver transducers 52 for reflecting acoustic energy from the receiver strips onto respective receiver transducers.

Figure 7A:
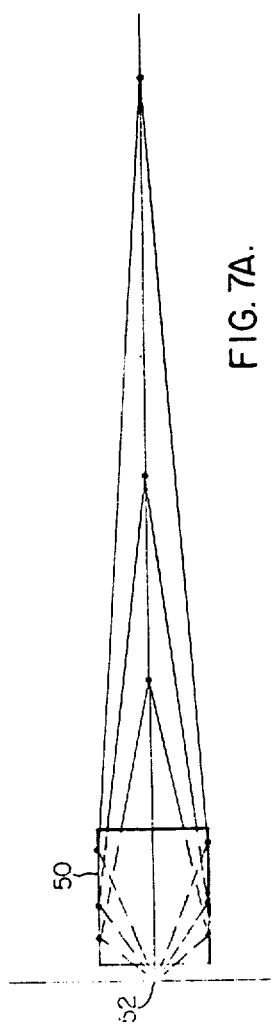
FIGS. 7A, B and C are similar to 5A, B and C however, with the reflective focusing element of FIG. 6.
Figure 7C:
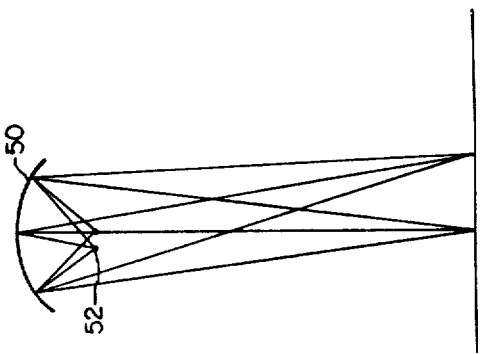
Figure 7B:
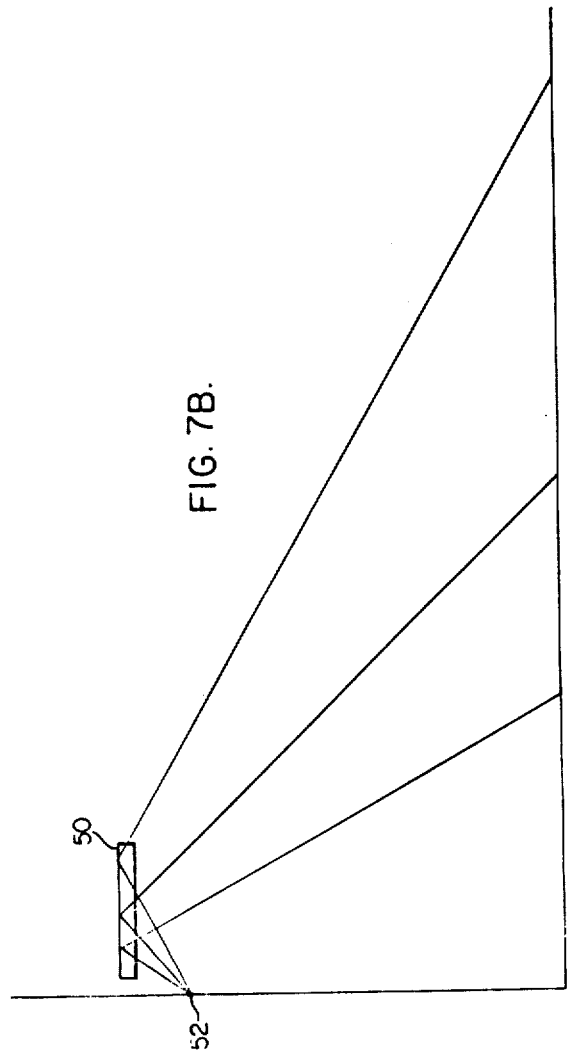

FIGS. 7A to 7C respectively illustrate plan, side and front views of the orientation of cylindrical reflector 50 relative to the transducer array 52 and additionally shows various ray paths as in FIGS. 5A to 5C.

Figure 8:
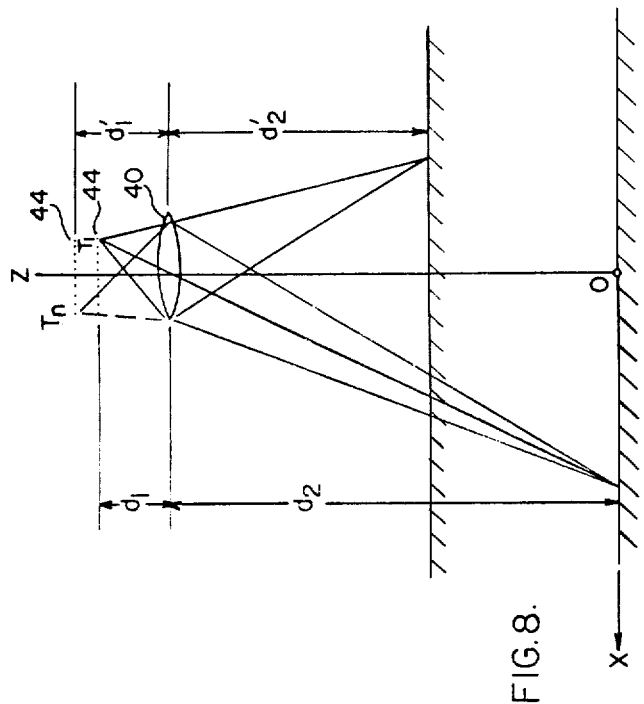
FIG. 8 illustrates the changing of focal planes of the apparatus of FIG. 4.

The relative distance between the lens 40 and the receiver transducer array 44 of FIG. 4 is for viewing a target area from a particular altitude. For example, and with respect to FIG. 8, if $d_1$ is the vertical distance between the horizontal middle of lens 40 and the transducer receiver array 44, the object plane will be at a distance of $d_2$, as illustrated. The acoustic path from an area on the first receiver strip is illustrated as being focused on the first receiver transducer $T_1$. If it is now desired to examine a target area, in an object plane which is closer to the lens at a distance of $d'_2$, the receiver array 44 may be moved further away from the lens to a distance $d'_1$. The acoustic array path from an area on the nth receiver strip is illustrated as being focused onto receiver transducer $T_n$. If f is the focal length of the lens 40, then $$\frac{1}{f} = \frac{1}{d_1} + \frac{1}{d_2} = \frac{1}{d'_1} + \frac{1}{d'_2}$$

Figures 6, 9A, 9B:
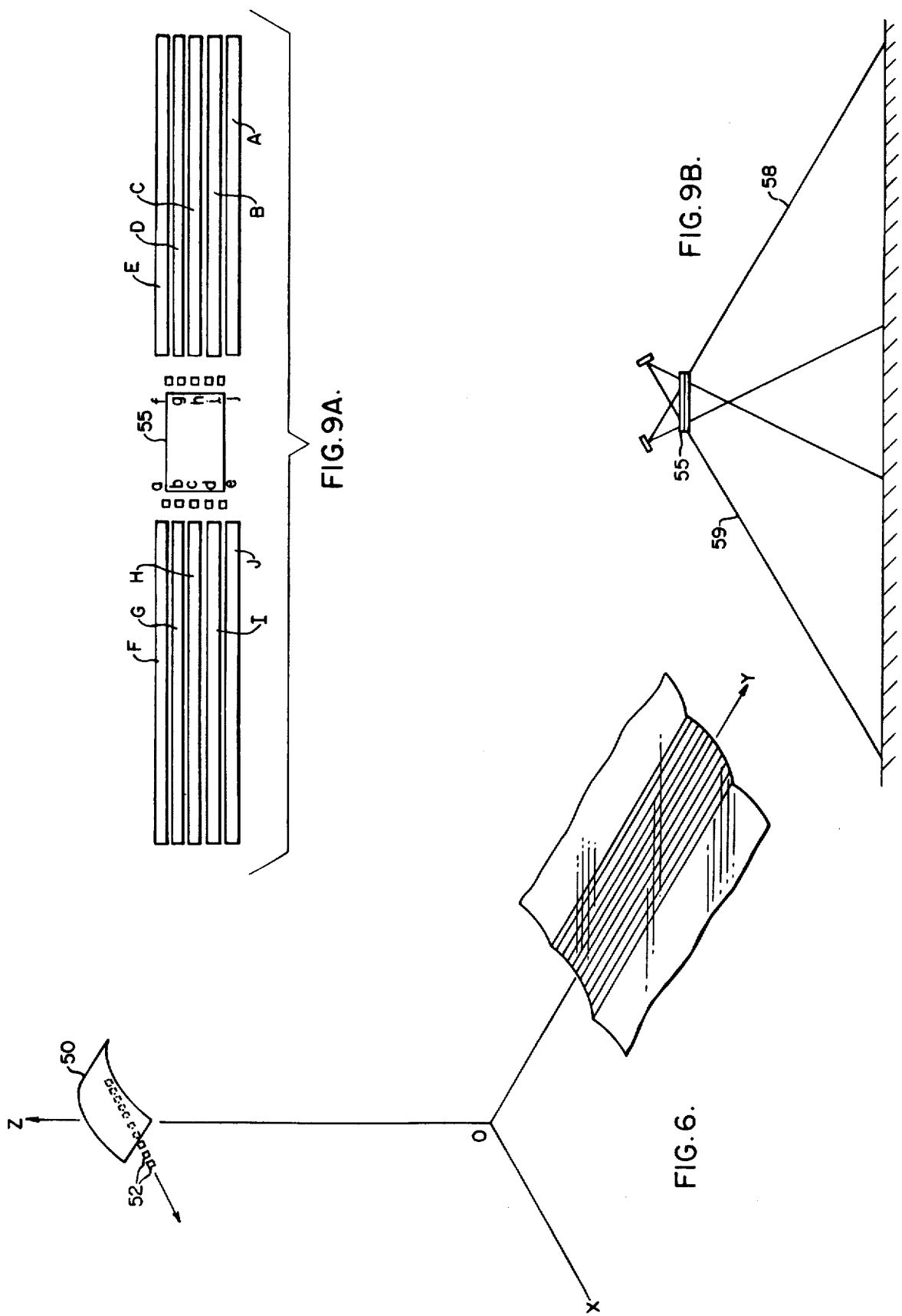
FIG. 6 illustrates the arrangement of FIG. 4 utilizing a reflective focusing element.
FIGS. 9A and B are respective plan and front views illustrating the formation of two sets of receiver beams with a single lens.

The same focusing elements as illustrated in FIG. 4 or 7, and mounted on a carrier vehicle, can be used to produce two sets of parallel receiver beams on two sides of the vehicle. FIGS. 9A and 9B illustrate the arrangement utilizing a cylindrical lens 55. FIG. 9A shows a plan view of the arrangement and for clarity only five receiver transducers per side are illustrated and are designated $a$ to $e$ for one side and $f$ to $j$ for the other side. Receiver transducers a through e receive reflected energy from respective receiver strips A through E and receiver transducers $f$ through $j$ receive reflected energy from respective receiver strips F through J. FIG. 9B shows a side view of the arrangement and illustrates two of the receiver beams 58 and 59 which would be formed. In other words, receiver beam 58 is one of five for one side and receiver beam 59 is one of five for the other side.

Figure 10:
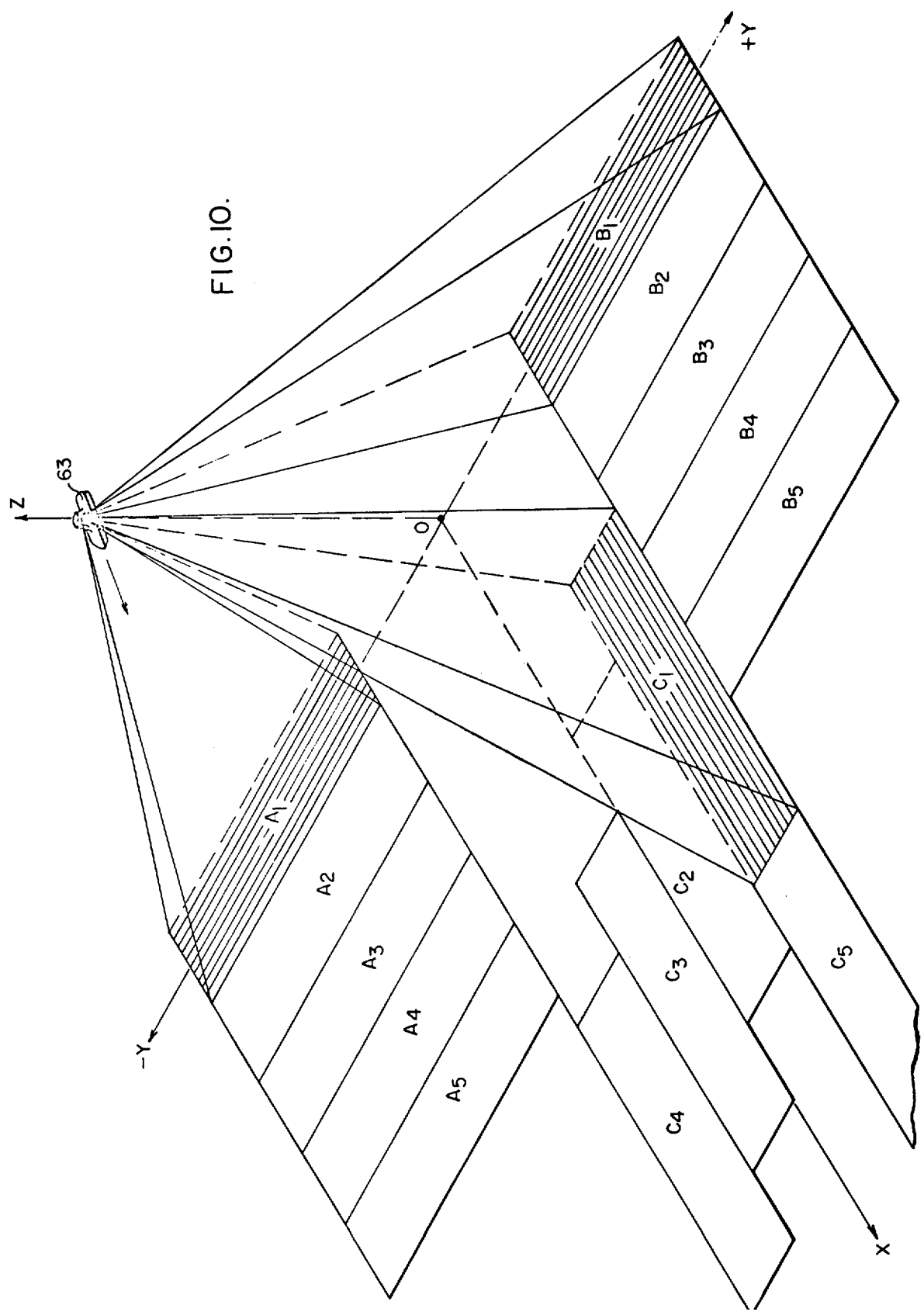
FIG. 10 illustrates the coverage of a high search rate sidelooking sonar combined with a forward looking sonar embodiment.

The apparatus illustrated in FIG. 9A is extremely useful for sidelooking sonar applications such as illustrated in FIG. 10, to which reference is additionally made. With the apparatus mounted on a carrier vehicle 63 and proceeding in the direction of the arrow, acoustic energy of frequency $f_1$ may be utilized to insonify a target area on the starboard side of the vehicle 63 and acoustic energy of a frequency $f_2$ may be utilized to insonify a target area on the port side of the vehicle. Tranducers $f$ through $j$ and their associated signal processing circuits will be designed for operation at frequency $f_1$ while tranducers a through e and their associated signal processing circuits will be designed for operation at the frequency $f_2$.

After an acoustic transmission to the port and starboard sides, returns will come in from the receiver strips to thereby portray target areas $A_1$ and $B_1$, as previously described. Since these areas display a target area of interest, only from some minimum range $R_m$ out to some maximum range $R_M$ an additional lens and transducer array may be provided on the carrier vehicle 63 in conjunction with a transmitter operable at a third frequency $f_3$, to obtain information relative to the bottom under the carrier vehicle path to fill in the area missed by the pair of side look systems. $C_1$ designates the area from which returns are processed concurrently with returns from areas $A_1$ and $B_1$. As the carrier vehicle proceeds in its travel, the next areas $A_2$ and $B_2$ are imaged while the forward looking apparatus is tipped or indexed to receive and portray the target area $C_2$. This indexing process is continued for the third transmission and display of areas $A_3$, $B_3$ and $C_3$ and continues for the fourth transmission for areas $A_4$, $B_4$ and $C_4$. For the fifth transmission, the forward looking apparatus is indexed back to its initial position so that area $C_5$ is imaged along with areas $A_5$ and $B_5$ with the process being repeated to yield a picture of not only the side areas but the bottom area beneath the carrier vehicle.

Figures 11, 12A, 12B:
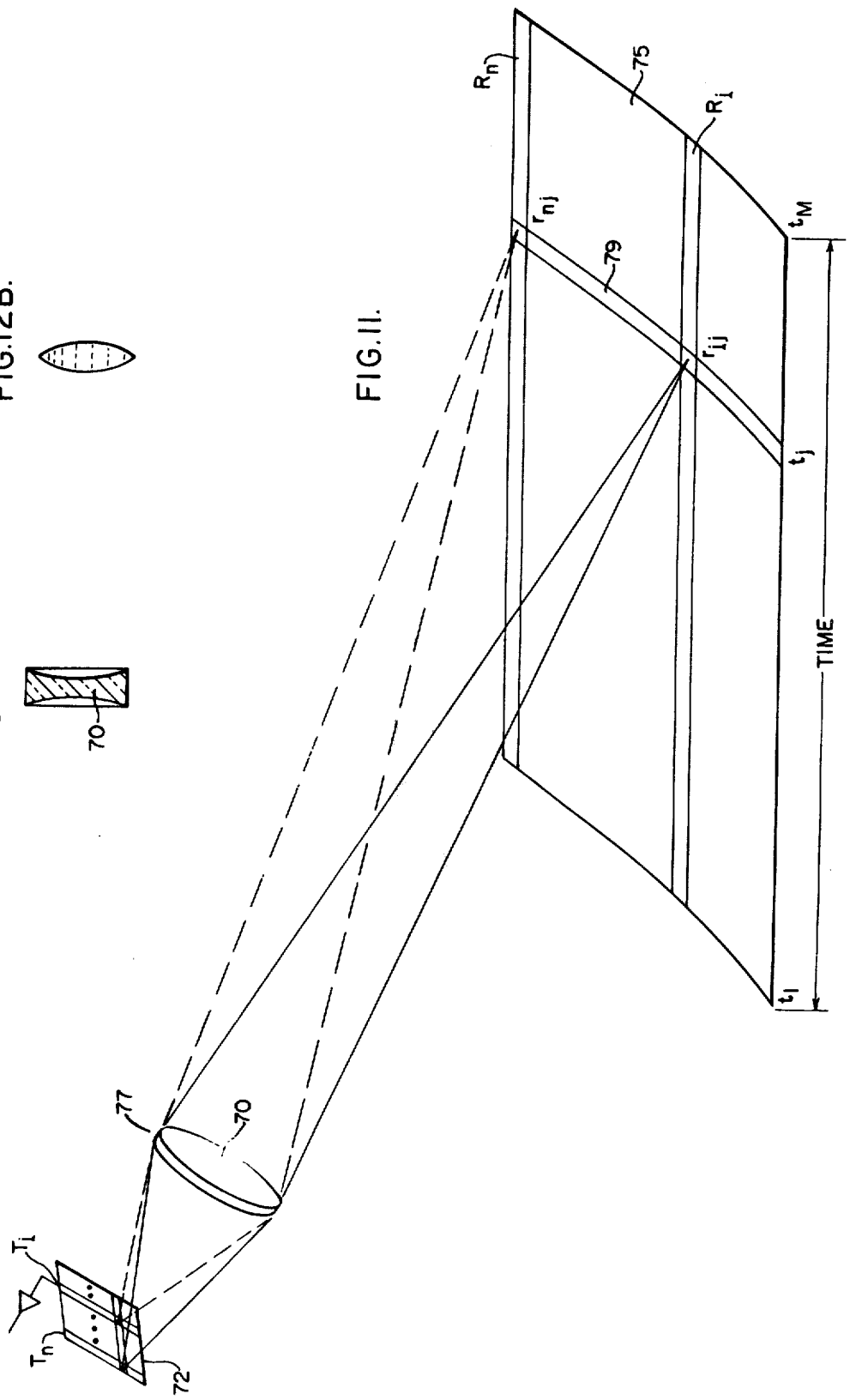
FIG. 11 illustrates an arrangement utilizing a spherical surface acoustic lens.
FIGS. 12A and 12B are cross sectional views of a respective solid and liquid spherical surface acoustic lenses.

In the arrangement of FIG. 2, all of the reflected energy from an elemental area of a receiver strip impinging upon the lens 24 is not concentrated onto a respective transducer since only energy impinging on a certain portion of the lens will be received by a transducer. It will be remembered that only returns from the minimum range of interest that pass through the lower portion of the lens focus on the transducers, while only returns from close to maximum range that pass through the upper portion of the lens focus on the transducers. With respect to the cylindrical lens or cylindrical reflector arrangement of FIG. 4 or 6, the same is true in that reflected energy from an elemental area of a receiver strip will be focused onto a respective transducer only if it strikes the lens 40 or reflector 50 at a certain angle. In FIG. 11, there is energy from an elemental area of a receiver strip impinging upon the lens element will be focused onto a respective receiver transducer so that for the same transmitted energy, higher level output signals will be provided. This is accomplished by the provision of an acoustic focusing element having one or more spherical surfaces such as the lens element 70 in FIG. 11 in conjunction with elongated receiver transducers.

A cross section through any diameter of the solid lens 70 is illustrated in FIG. 12A. If a thin shelled liquid filled lens were used which had a velocity lower than that of water, if would have a diametrical cross sectional as illustrated in FIG. 12B. Although the front and rear surfaces of these lenses are shown to have the same curvature, different curvatures could be utilized and one surface could even be planar.

Referring back to FIG. 11, disposed behind the lens 70 is a receiver transducer array 72. In order to receive all of the reflected acoustic energy from a receiver strip from the minimum range out to the maximum range each receiver transducer for the arrangement utilizing a spherical surface lens must be of a narrow elongated design as illustrated by two transducers of the array $T_i$ and $T_n$.

FIG. 11 shows two receiver strips $R_i$ and $R_n$ on the target area 75. As previously explained, a transmitter transducer 77 projects a short pulse of acoustic energy which insonifies a narrow strip on the target area and proceeds outwardly in the range direction from a time $t_1$ at the minimum range out to a time $t_M$ at the maximum range. Returns from the receiver strips at the minimum range of interest will be focused onto the transducers near the tops thereof and returns from the maximum range of interest will be focused onto the transducers at the bottom portions thereof. FIG. 11 illustrates the scanning insonifying strip at some intermediate time $t_j$. The intersection of the insonifying strip 79 with the receiver strip $R_i$ is an elemental area designated $r_{i,j}$. The intersection with receiver strip $R_n$ is an elemental area designated $r_{n,j}$, with the acoustic reflections from these elemental areas being illustrated as impinging upon the lens 70 and thereafter being focused onto respective receiver transducers $T_i$ and $T_n$.

An operative acoustic camera including transmitting, receiving and display sections will now be described with respect to FIG. 13. The acoustic lens 83 is located on the Z axis and in front of a receiver transducer array 85. A transmitter transducer (projector) 87 in response to an output from transmitter 90 provides an acoustic pulse to insonify at least an area equal to the target area 92 to be viewed. In response to the receipt of acoustic energy from the receiver strips, the transducers of the array 85 will provide respective output signals to receiving circuits 95 the outputs of which are periodically sampled by means of an electronic sampling circuit 97. The display section includes a cathode ray tube (CRT) 100 having deflection circuits 102 provided with sweep signals from a horizontal sweep generator in horizontal control circuit 104 and from a vertical sweep generator in vertical control circuit 106. In this embodiment, since a TV display is being utilized, and since no storage is provided, the transmitter 90 is operable to provide repetitive energizations of the transmitter transducer 87 and in this regard each acoustic transmission can be governed by a new vertical sweep of the display so that the vertical control circuit 106 may provide a synchronizing signal to the transmitted 90 to initiate a transmission for each new frame to be displayed.

Th sampled detected signals from the sampling circuit 97, which is synchronized by a signal from the horizontal control circuit 104, are provided to a video amplifier 110 the output signal of which is provided to the cathode ray tube 100 so that the target area 92 may be displayed on the CRT 100 as a display area 92'.

Figure 14:
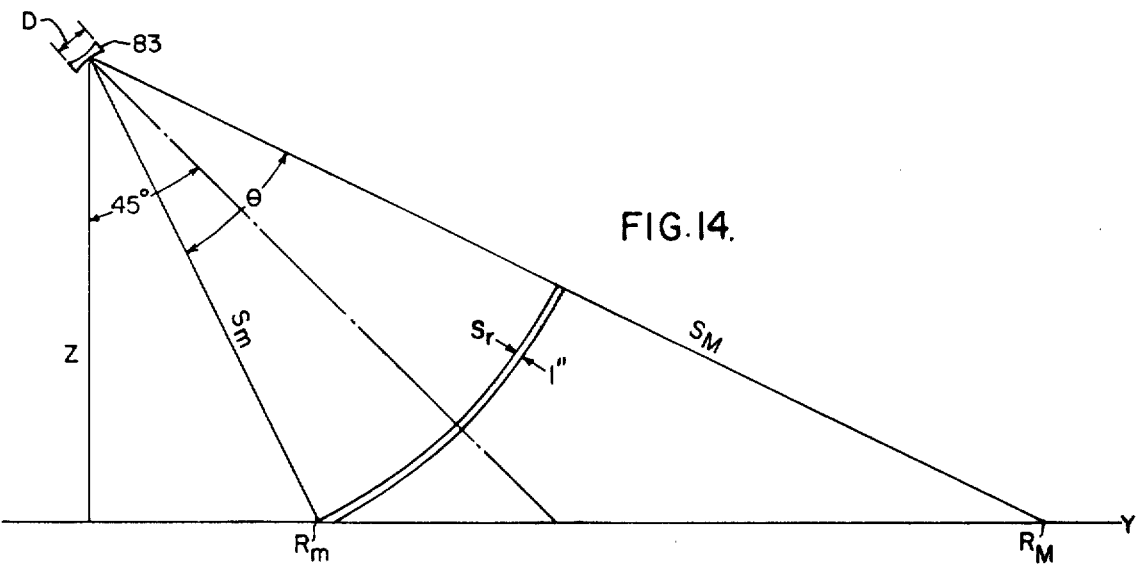
FIG. 14 is a side elevational view illustrating the orientation of an acoustic lens with respect to a target area and giving certain dimensions.
Figure 15:
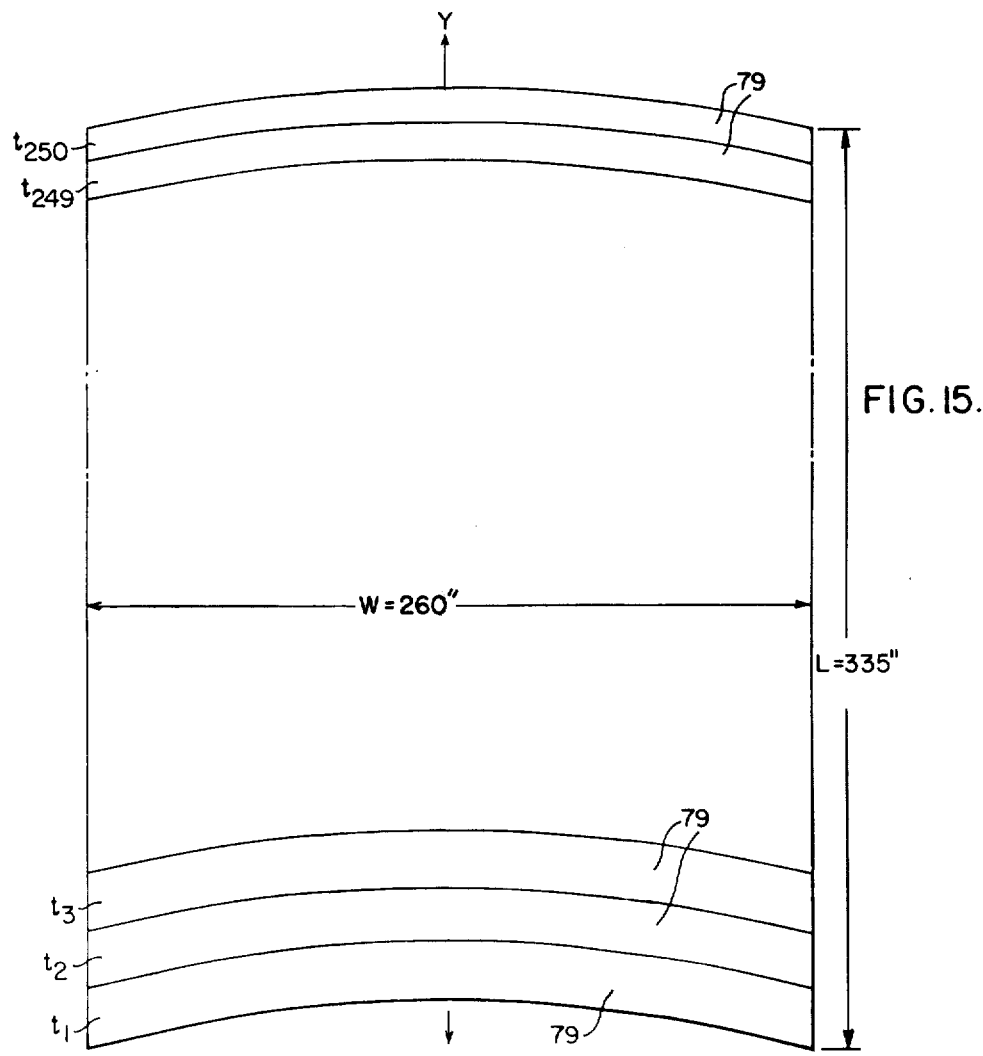
FIG. 15 is a plan view of a target area illustrating certain dimensions.

The following discussion develops a set of exemplary parameters for the arrangement of FIG. 13. Reference should additionally be made to FIG. 14 which shows various dimensions in a side elevational view of the lens and target area, and FIG. 15 illustrating a plan view of the target area.

The lens 83 may be a solid polystyrene lens having a diameter of 9 inches and a focal length of 13 inches with its central axis being oriented at an angle of 45° with respect to the Z axis. The vertical beam width 0 is in the order of 40°. The maximum slant range $S_M$ is designed to be at least 1.5 times the minimum slant range and in the present example $S_M$ is 500 inches and the minimum slant range $S_m$ is half the maximum, or 250 inches, that is $S_M/S_m = 2$. With a maximum slant range of 500 inches, acoustic energy may be transmitted and returned from the maximum range in 1/60th of a second so that the pulse repetition frequency of the transmitter would be 60 Hertz. The frequency of the acoustic energy transmitted may be in the order of 3 megahertz so that the wavelength λ in water would be 0.02 inches.

For a slant range resolution $S_r$ of 1 inch the transmitted pulse length would be 33.3 microseconds. With this slant range resolution of 1 inch, and $S_m$ being half of the $S_M$ there will be 250 range elements, designated 79 in FIG. 15 with the time of travel from one position to the next being 33.3 microseconds. These strips 79 represent the insonifying strip from time $t_1$ to $t_{250}$. For the geometry given, the width of the insonifying strip in the range direction Y would progressively decrease with range.

The viewed target area has a width W of 260 inches and a length L of 335 inches and with the number of receiver transducers chosen to be 200, the area will be divided into 200 receiver strips thereby resulting in a total number of picture elements of 250 × 200 or 50,000.

Figure 16:
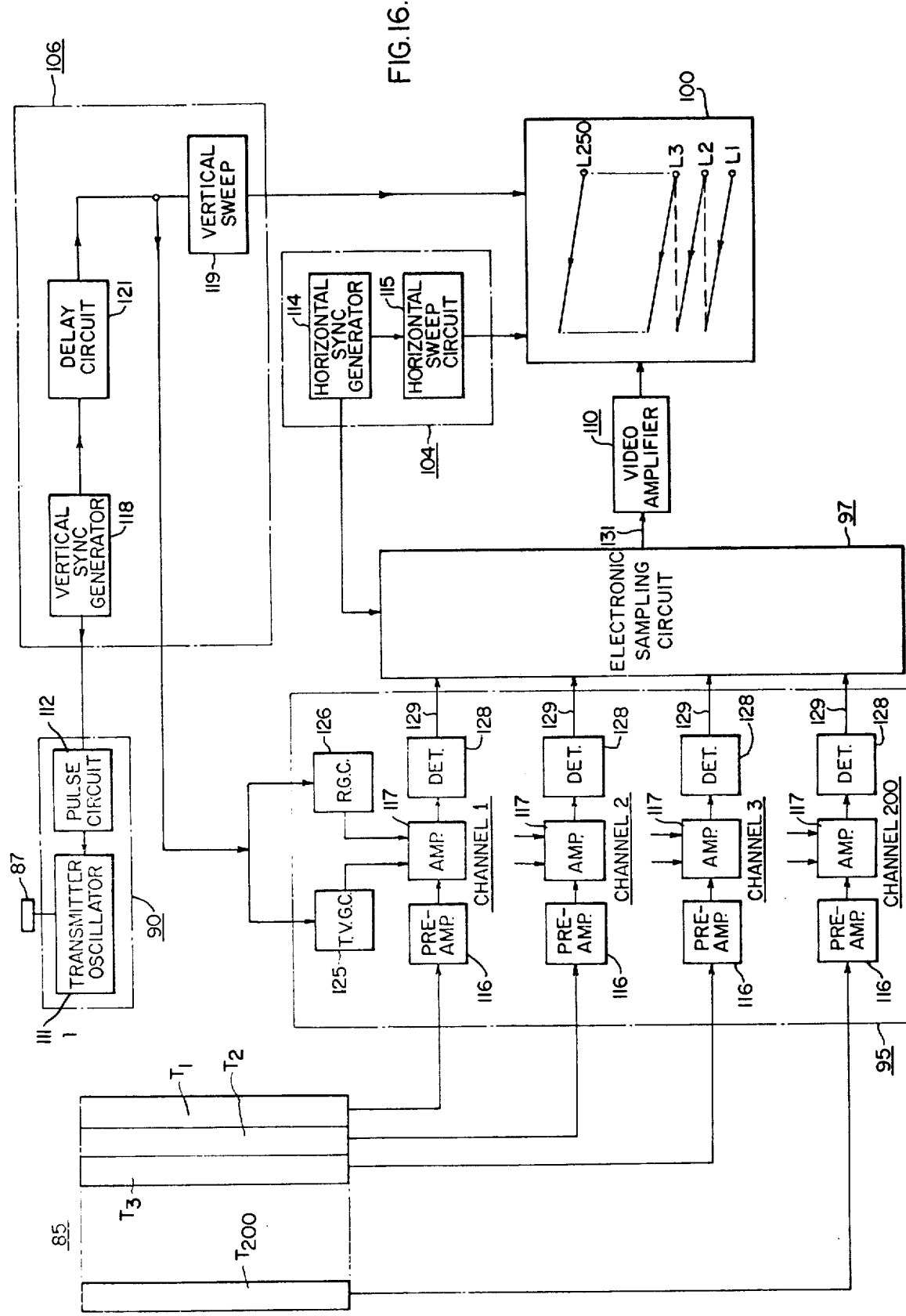
FIG. 16 is a block diagram illustrating the arrangement of FIG. 13 in somewhat more detail.

Exemplary parameters for the receiver and display apparatus will be developed with additional reference to FIG. 16 illustrating the components of FIG. 13 in somewhat more detail. The transmitter section 90 includes a transmitter oscillator 111 operable to provide the transmitting transducer 87 with the 3 megahertz signal for a time duration of 33.3 microseconds as governed by the pulser circuit 112 which in turn receives a command signal from the vertical sweep control circuit 106 each time a new field is to be displayed on the cathode ray tube 100.

The horizontal control circuit 104 includes a horizontal sync generator 114 for providing a sync signal to the horizontal sweep circuit 115, which in turn supplies the necessary horizontal sweep signal to the CRT 100. Similarly the vertical control circuit 106 includes a vertical sync generator 118 for providing a sync signal to the vertical sweep circuit 119, after a predetermined delay by delay circuit 121, so as to supply the CRT with the necessary vertical sweep signal.

The sync generators are of the well known type commonly used in a TV transmitter except that the frequencies used may be different. In use, the horizontal sync frequency will be an exact multiple of the vertical sync frequency.

In response to received reflected acoustic energy, each receiver transducer $T_1$ to $T_{200}$ will provide an output signal to the receiver section 95 which is seen to include 200 channels each one connected to a respective receiver transducer. Each receiver transducer output signal is fed to a respective preamplifier 116 in each channel and is further amplified in amplifier 117. For display purposes, it is desired that the typical no target bottom return pattern be somewhat uniform in appearance. Accordingly, to compensate for decreasing acoustic signal strength due to spreading, absorption, and angle of incidence with the bottom, there is provided a time varying gain circuit 125 which is responsive to the delayed output signal from vertical sync generator 118 to provide each amplifier 117 of all the channels with a control signal which varies the gain of the amplifier from a low value to a high value in accordance with a prescribed curve during the time that a return signal is present. In order to insure that only returns from the minimum range of interest out to the maximum range of interest are processed, there is provided a range gate circuit 126 which is also synchronized by the delayed output signal of the vertical sync generator 118 to turn on the amplifiers 117 during a prescribed time interval.

The received signal in each channel is then detected for informational content thereof by detectors 128 which present the detected signals on respective output leads 129 to the sampling circuit 97. Since the insonifying strip (see FIG. 15) is at its next position, in 33.3 microseconds, the sampling circuit 97 must be constructed and arranged to sample all of the channels in less than 33.3 microseconds in order to allow for horizontal retrace of the cathode ray beam of the display. Accordingly, 3.3 microseconds are allotted for horizontal retrace. The 200 channels must be sampled during a period of 30 microseconds and since there are 200 channels, the sample time for each channel will be 30 divided to 200 or 0.15 microseconds for a sampling frequency of (1/0.15s) microseconds 6.66 megahertz. This sampling sequence must repeat for every 33.3 microsecond movement of the insonifying strip, and accordingly, the sampling circuit 97 must perform its sampling function at a frequency of (1/33.3 microseconds) 30 kilohertz and will do so in response to a signal provided by the horizontal sync generator 114.

The sampling circuits output signal on lead 131 for 1 scan is the information provided to the cathode ray tube 100 for writing one scan line on the display.

The scanning of the cathode ray beam starts in the lower right-hand corner as illustrated and proceeds to the left. During the first scanning operation, and amplification by video amplifier 110 line L1 is written after which, as indicated by the dotted line, there is a retrace to commence writing of line L2 with a second sampling operation. The sequence continues until the last line L250 of the display is written, after which a new acoustic transmission takes place and the electron beam of the display retraces vertically whereupon the previously described sequence of operations is repeated.

Figure 17:
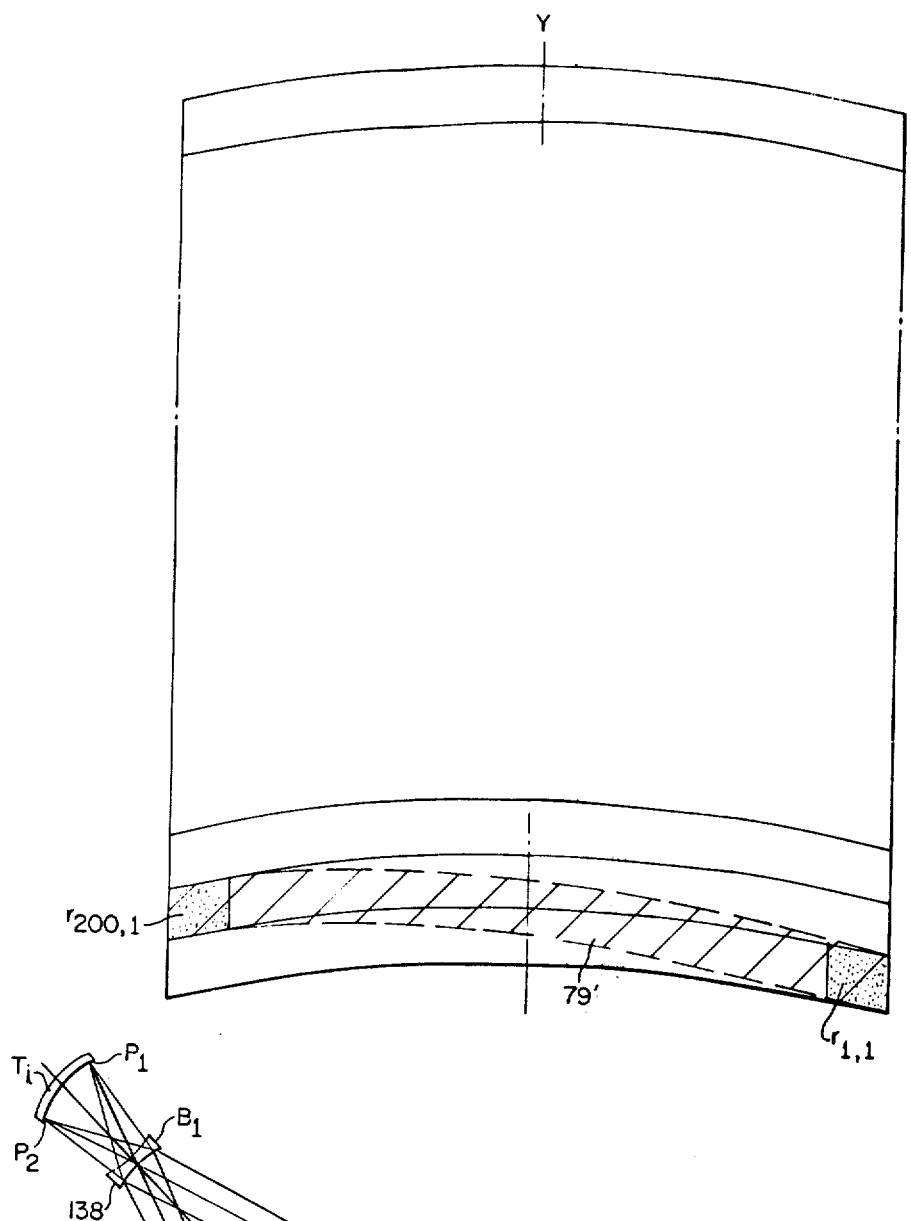
FIG. 17 is similar to FIG. 15 and shows actual elemental areas displayed.

The different positions of the insonifying strip 79 have been illustrated in FIG. 15. Several of these positions are also illustrated in FIG. 17 to show that the displayed area actually looks like due to the finite scanning time involved. The dotted area $r_{1,1}$ in FIG. 17 represents the elemental area portrayed as a result of sampling output of channel 1. The sampling circuit 97 thereafter samples the subsequent channels and by the time the 200th channel is sampled 30 microseconds later the elemental area displayed is actually that dotted area $r_{200,1}$ so that in effect the scanning strip portrayed on the display is the cross hatched strip designated 79' which travels out in the range axis Y. This provides an entirely satisfactory display of the target area and although the small lower left corner is not displayed an extra area will be portrayed at the upper left corner. Alternatively the transmitter transducer may be skewed slightly so that the original strips 79 etc. are displayed.

Each TV line therefore is divided into 200 adjacent segments, each segment portraying the output signal of a respective receiver transducer, and each new line representing a new position of the insonifying strip from the minimum out to the maximum range. If desired, the various sweep voltages may be tailored to eliminate any possible distortion in the display and if desired, alternate sampling techniques may be provided to accomplish either line or dot interlacing in the display.

For operation at ranges greater than discussed above, the pulse repetition rate must be reduced and lower frequencies should be used. To avoid flicker problems in the display, some sort of storage should be provided such as a cathode ray tube with a long persistence phosphor, a scan converter tube, a storage display tube, magnetic disc storage, to name a few. A permanent display may be provided by utilization of photographic film or other types of recording film.

For ease of manufacture, the receiver transducer array may be fabricated from a flat sheet of transducer material which can be sliced into adjacent elongated transducers. For optimum performance however, a preferred arrangement is as illustrated in FIG. 18 showing a side view of the relative orientation of the lens and receiver transducer with respect to the bottom area to be viewed.

Figure 18:
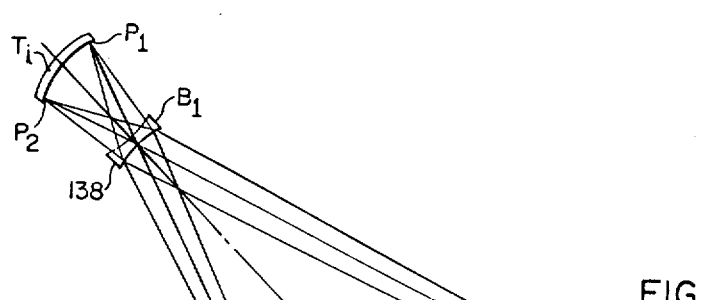
FIG. 18 illustrates the preferred arrangement of a receiver transducer with respect to the acoustic lens.

The spherical lens 138 in FIG. 18 is similar to that shown in FIG. 11. The lens 138 is oriented to point to a target area of interest with the lens axis at a certain angle $\alpha$ relative to the vertical. Acoustic returns from a receiver strip, and more particularly, from the minimum range on the receiver strip focus onto a point $P_1$, while returns from the maximum range from that same receiver strip focus onto a point $P_2$. Returns from points intermediate the minimum and maximum range will be focused on a curve, and the receiver transducer element $T_i$ is made to conform to that curve. Due to the orientation of the apparatus, it may be seen that the lower part of the transducer $T_i$ (at point $P_2$) is closer to the lens 138 than the upper part (at point $P_1$). With this orientation relative to the lens 138, and with the designed curvature, the acoustic return from anywhere along the receiver strip will be in focus thus assuring optimal performance of the apparatus. For ease of explanation, the acoustic rays are shown emanating from and focusing to a point however, it will be understood that in actuality, finite areas are involved and the points may be considered to be the center of such elemental areas.

Each receiver transducer will be of a sufficient length, for example tens of λ to hundreds or thousands of λ, to intercept focused reflected acoustic energy from the minimum range out to the maximum range and it is preferred that the width of each receiver transducer shown be approximately equal to the $f$ number of the lens times the operating wavelength $\lambda$. The $f$ number of the lens is the focal length divided by the diameter. For $f = 1.45$ and $\lambda = 0.02$ inch a transducer width of 0.029 inch is satisfactory, and in general the length will be approximately equal to the lens diameter.

It has been mentioned that means are provided for varying the relative distance between the receiver transducer and the lens for changing the focal plane. One way of accomplishing this, is illustrated in FIG. 19 and in FIG. 20 which is a view along the line XX of FIG. 19. The lens and receiver components are carried by a case 140 consisting of two sections 141 and 142 movable relative to one another by virtue of the threaded engagement between these two sections. Section 141 carries an acoustic lens 144 while section 142 carries a receiver transducer array 146 mounted on a support disc 147 which may also carry the necessary signal processing circuits 150, suitably potted. The transducer array 146 is movable around a pivot 152 for proper orientation with respect to the lens 144, as described in FIG. 18, and the orientation may be secured by means of a clamp arrangement 155, including a slotted bracket 156, a clamp knob 157 and a handle 158 which extends through slot 159 for moving the unit about the pivot 152.

By simply moving section 141 relative to section 142 of the cae 140, the distance between the lens and the receiver array may be changed to accommodate for different target area distances.

For ease of understanding, the shapes of the transducer arrays and target areas have been somewhat idealized. In actual practice, there may be overlap of receiver strips or alternatively, there may be small gaps, however, in either case, a display adequate for most purposes will be provided. The target area illustrated in FIG. 21 to be produced with the use of spherical surface lens would require a transducer array shaped like that illustrated in FIG. 22. The elongated transducer array previously described, and shown in FIG. 23 would actually produce a target area shaped like that illustrated in FIG. 24. Such shape may be displayed on the cathode ray tube in a conventional XY scan in a somewhat distorted manner or alternatively, a sector scan may be provided as is well known to those skilled in the art, to reproduce the exact shape illustrated.

When use is made of the cylindrical lens, or the variable focus lens, the transducer array as illustrated in FIG. 25 will receive information from a target area as illustrated in FIG. 26.

In each instance with the receiver transducers being essentially point transducers (1 $\lambda$ to 3 $\lambda$) for example in FIGS. 2, 4 and 6, or stave type transducers as in FIG. 13, the placement of the transducers relative to the focusing element is such as to be outside the focal surface so that operation is in the near field whereby the resolution obtained in the lateral direction (X axis) is better than the size of the receiver aperture i.e. the focusing element dimension in the X direction. This near field region, also known as the Fresnel region extends from the apparatus out to a distance of roughly $2D^2/\lambda$ where D is the aperture dimension and $\lambda$ the operating wavelength in the water.

We claim:

1. An acoustic camera for imaging a target area comprising:
   A. receiver means for forming a plurality of adjacent receiver beams each for receiving acoustic returns from respective adjacent receiver strips of said target area, said receiver strips being relatively long in the target range direction and relatively narrow in a direction perpendicular thereto;
   B. transmitter means for insonifying said target area to be viewed and operable to provide a short time pulse of acoustic energy to insonify a strip relatively narrow in said range direction and at least equal to the width of said target area to be viewed;
   C. said transmitter means being arranged that said insonifying strip sweeps out said target area from a minimum range $R_m$ to a maximum range of interest $R_M$ in a predetermined time period, the intersection of said insonifying strip with said receiver strips defining a plurality of elemental areas;
   D. said receiver means including a plurality of receiver transducers and an acoustic focusing element positioned relative to said plurality of receiver transducers and having at least one cylindrical surface arranged to focus, from said minimum range $R_m$ out to said maximum range $R_M$, acoustic returns from respective ones of said elemental areas onto respective ones of said receiver transducers;
   E. said receiver transducers being operable to provide respective output signals in response to impingement of focused acoustic returns; and
   F. means for processing and displaying said output signals.

2. Apparatus according to claim 1 wherein:
   A. said focusing element is a cylindrical reflector positioned above and in front of said plurality of receiver transducers, relative to said target area.

3. Apparatus according to claim 1 wherein:
   A. said focusing element is an acoustic lens disposed about a lens axis and positioned below and in front of said plurality of receiver transducers, relative to said target area.

4. Apparatus according to claim 3 wherein:
   A. said lens axis is oriented generally parallel to the plane of said target area.

5. Apparatus according to claim 3 wherein:
   A. said lens includes both a cylindrical top and cylindrical bottom surface.

6. Apparatus according to claim 1 wherein:
   A. each said receiver transducer is essentially a point receiver having a maximum dimension of 1 $\lambda$ to 3 $\lambda$ where $\lambda$ is the operating wavelength in the medium in which the apparatus is operating.

7. Apparatus according to claim 1 which includes:
   A. means for moving said plurality of receiver transducers relative to said focusing element to view target areas from different relative altitudes.

8. Apparatus according to claim 1 which includes:
   A. means for similarly insonifying a second target area;
   B. a second plurality of receiver transducers;
   C. the first plurality of receiver transducers and said second plurality of receiver transducers being oriented relative to said acoustic focusing element to respectively receive acoustic returns from the first and said second target areas.

9. Apparatus according to claim 8 wherein:

A. said transmitter means is operable to provide repetitive acoustic transmissions.

10. Apparatus according to claim 9 which includes:
A. a carrier vehicle operable to travel a predetermined path and to carry said apparatus for imaging first and second target areas to the sides of said carrier vehicle path; said apparatus additionally including
B. means for similarly insonifying a third target area ahead of said carrier vehicle; and
C. means for receiving and processing acoustic returns from said third target area for imaging the area below said carrier vehicle path.

11. Apparatus according to claim 10 wherein:
A. said apparatus is constructed and arranged to image the area from the minimum range of said first target area to the minimum range of said second target area.

12. Apparatus according to claim 1 wherein:
A. said receiver transducers are positioned outside the focal surface of said focusing element.

13. Apparatus according to claim 1 wherein:
A. the slant range distance $S_M$ from said focusing element to said maximum range of interest is at least 1.5 times the slant range distance $S_m$ to said minimum range of interest.

* * * * *